United States Patent
Nakai et al.

(10) Patent No.: US 11,984,600 B2
(45) Date of Patent: May 14, 2024

(54) BINDER COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventors: Akito Nakai, Tokyo (JP); Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 1 day.

(21) Appl. No.: 18/040,149

(22) PCT Filed: Aug. 24, 2021

(86) PCT No.: PCT/JP2021/031044
§ 371 (c)(1),
(2) Date: Feb. 1, 2023

(87) PCT Pub. No.: WO2022/045154
PCT Pub. Date: Mar. 3, 2022

(65) Prior Publication Data
US 2023/0268513 A1  Aug. 24, 2023

(30) Foreign Application Priority Data

Aug. 31, 2020 (JP) .................................. 2020-146311

(51) Int. Cl.
*H01M 4/60* (2006.01)
*C08F 236/12* (2006.01)
*C08K 5/02* (2006.01)
*H01B 1/24* (2006.01)
*H01M 4/62* (2006.01)

(52) U.S. Cl.
CPC ............ *H01M 4/622* (2013.01); *C08F 236/12* (2013.01); *C08K 5/02* (2013.01); *H01B 1/24* (2013.01); *H01M 4/625* (2013.01)

(58) Field of Classification Search
CPC ... H01B 1/00; H01B 1/20; H01B 1/24; C09D 5/24; C09D 7/40; H01M 4/622
See application file for complete search history.

(56) References Cited

U.S. PATENT DOCUMENTS 10,388,961 B2 * 8/2019 Fukumine ............... C08L 27/16
10,468,713 B2   11/2019 Katagiri et al.
11,784,313 B2 * 10/2023 Matsumura ............. C08L 27/20
                                                        429/217

FOREIGN PATENT DOCUMENTS

WO  2016103730 A1  6/2016
WO  2017010093 A1  1/2017

OTHER PUBLICATIONS

Konios et al "Dispersion behaviour of graphene oxide and reduced graphene oxide", Journal of Colloid and Interface Science 430 (2014) 108-112.*
Giordani et al "Effect of Solvents and Dispersants on the Bundle Dissociation of Single-walled Carbon Nanotube", AIP Conf. Proc. 786, 232-235 (2005).*
Feb. 28, 2023, International Preliminary Report on Patentability issued in the International Patent Application No. PCT/JP2021/031044.

* cited by examiner

Primary Examiner — Mark Kopec
(74) Attorney, Agent, or Firm — KENJA IP LAW PC

(57) ABSTRACT

Provided is a binder composition for an electrochemical device that has excellent viscosity stability and is capable of forming an electrode having excellent peel strength. The binder composition contains a polymer including a nitrile group-containing monomer unit, N-methyl-2-pyrrolidone, and a halogenated hydrocarbon. The content of the halogenated hydrocarbon is not less than 2 mass ppm and not more than 400 mass ppm relative to the content of the polymer.

8 Claims, No Drawings

BINDER COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a binder composition for an electrochemical device, a conductive material dispersion liquid for an electrochemical device, a slurry for an electrochemical device electrode, an electrode for an electrochemical device, and an electrochemical device.

BACKGROUND

Electrochemical devices such as lithium ion secondary batteries, lithium ion capacitors, and electric double-layer capacitors have characteristics such as compact size, light weight, high energy-density, and the ability to be repeatedly charged and discharged, and are used in a wide variety of applications. Consequently, in recent years, studies have been made to improve battery members such as electrodes with the aim of achieving even higher electrochemical device performance.

An electrode used in an electrochemical device normally includes a current collector and an electrode mixed material layer formed on the current collector. This electrode mixed material layer is formed by, for example, applying a slurry containing an electrode active material, a binder-containing binder composition, and so forth onto the current collector and then drying the applied slurry.

In recent years, attempts have been made to improve binder compositions used in the formation of electrode mixed material layers with the aim of achieving further improvement of electrochemical device performance. For example, studies have been made in relation to a technique of using a polymer that includes a nitrile group-containing monomer unit as a binder contained in a binder composition (for example, refer to Patent Literature (PTL) 1 and 2).

CITATION LIST

Patent Literature

PTL 1: WO2016/103730A1
PTL 2: WO2017/010093A1

SUMMARY

Technical Problem

It is desirable for a binder composition for an electrochemical device to maintain viscosity stability while also causing an electrode mixed material layer that has been obtained using the binder composition to display strong close adherence to a current collector (i.e., cause an electrode to display excellent peel strength). Moreover, there is room for further improvement in the conventional technique described above in terms of ensuring viscosity stability of a binder composition while also increasing peel strength of an electrode.

Accordingly, one object of the present disclosure is to provide a binder composition for an electrochemical device that has excellent viscosity stability and is capable of forming an electrode having excellent peel strength.

Another object of the present disclosure is to provide a conductive material dispersion liquid for an electrochemical device and a slurry for an electrochemical device electrode that are capable of forming an electrode having excellent peel strength.

Yet another object of the present disclosure is to provide an electrode for an electrochemical device that has excellent peel strength and an electrochemical device that includes this electrode for an electrochemical device.

Solution to Problem

The inventors conducted diligent investigation with the aim of solving the problem set forth above. The inventors discovered that in the case of a binder composition that contains a polymer including a nitrile group-containing monomer unit (hereinafter, also referred to simply as a "nitrile polymer"), N-methyl-2-pyrrolidone (hereinafter, also abbreviated as "NMP"), and a halogenated hydrocarbon and in which the quantitative ratio of the halogenated hydrocarbon relative to the nitrile polymer is within a specific range, this binder composition has excellent viscosity stability and an electrode mixed material layer formed using this binder composition can display strong close adherence to a current collector. In this manner, the inventors completed the present disclosure.

Specifically, the present disclosure aims to advantageously solve the problem set forth above, and a presently disclosed binder composition for an electrochemical device comprises: a polymer including a nitrile group-containing monomer unit; N-methyl-2-pyrrolidone; and a halogenated hydrocarbon, wherein content of the halogenated hydrocarbon is not less than 2 mass ppm and not more than 400 mass ppm relative to content of the polymer. A binder composition that contains a nitrile polymer, NMP, and a halogenated hydrocarbon and in which the content of the halogenated hydrocarbon is within the range set forth above has excellent viscosity stability, and by using this binder composition, it is possible to produce an electrode having excellent peel strength.

The phrase "includes a monomer unit" as used in the present disclosure means that "a polymer obtained with the monomer includes a repeating unit derived from the monomer". Moreover, the proportions in which a polymer includes monomer units and/or structural units can be measured by a nuclear magnetic resonance (NMR) method such as $^1$H-NMR or $^{13}$C-NMR.

Furthermore, the "content of a halogenated hydrocarbon" referred to in the present disclosure can be measured by gas chromatography.

In the presently disclosed binder composition for an electrochemical device, peak width of loss tangent tan δ in a viscoelasticity characteristic for the polymer is preferably not less than 5° C. and not more than 30° C. When the peak width of the loss tangent tan δ in a viscoelasticity characteristic for the nitrile polymer is within the range set forth above, resistance of an electrode can be reduced while also causing an electrochemical device to display excellent cycle characteristics.

Note that the "peak width of loss tangent tan δ in a viscoelasticity characteristic" referred to in the present disclosure can be measured by a method described in the EXAMPLES section.

In the presently disclosed binder composition for an electrochemical device, a proportion constituted by molecular terminals formed of a linear alkyl group having a carbon number of 6 or more among all molecular terminals in the polymer is preferably 30% or more. When the number of all molecular terminals included in a plurality of molecular chains that constitute the nitrile polymer is taken to be 100% and when a linear alkyl group having a carbon number of 6 or more is present at 30% or more of these terminals (i.e., when 30% or more of terminals are each a linear alkyl group in which at least 6 carbon atoms are linked in a row), flexibility of an electrode can be improved while also reducing resistance of the electrode, and rate characteristics of an electrochemical device can be improved.

Note that the "proportion constituted by molecular terminals formed of a linear alkyl group having a carbon number of 6 or more among all molecular terminals" in a polymer that is referred to in the present disclosure can be measured by a method described in the EXAMPLES section.

Moreover, the present disclosure aims to advantageously solve the problem set forth above, and a presently disclosed conductive material dispersion liquid for an electrochemical device comprises: any one of the binder compositions for an electrochemical device set forth above; and a carbonaceous material. By using a conductive material dispersion liquid that contains any one of the binder compositions set forth above and a carbonaceous material, it is possible to produce an electrode having excellent peel strength.

In the presently disclosed conductive material dispersion liquid for an electrochemical device, it is preferable that the carbonaceous material includes one or more carbon nanotubes, and the carbon nanotubes have a surface base content of not less than 0.01 mmol/g and not more than 0.10 mmol/g and a ratio of surface acid content relative to the surface base content of not less than 0.1 and not more than 1.0. By using carbon nanotubes (hereinafter, also abbreviated as "CNTs") having the properties set forth above as the carbonaceous material, it is possible to improve dispersion stability of the conductive material dispersion liquid while also reducing resistance of an obtained electrode and improving rate characteristics of an electrochemical device.

Note that the "surface base content" and "surface acid content" of CNTs referred to in the present disclosure can be measured by methods described in the EXAMPLES section.

Furthermore, the present disclosure aims to advantageously solve the problem set forth above, and a presently disclosed slurry for an electrochemical device electrode comprises: any one of the conductive material dispersion liquids for an electrochemical device set forth above; and an electrode active material. By using a slurry for an electrode that contains any one of the conductive material dispersion liquids set forth above and an electrode active material, it is possible to produce an electrode having excellent peel strength.

Also, the present disclosure aims to advantageously solve the problem set forth above, and a presently disclosed electrode for an electrochemical device comprises an electrode mixed material layer formed using the slurry for an electrochemical device electrode set forth above. An electrode that includes an electrode mixed material layer obtained using the slurry for an electrode set forth above has excellent peel strength.

Moreover, the present disclosure aims to advantageously solve the problem set forth above, and a presently disclosed electrochemical device comprises the electrode for an electrochemical device set forth above. An electrochemical device that includes the electrode set forth above has excellent device characteristics such as rate characteristics.

Advantageous Effect

According to the present disclosure, it is possible to provide a binder composition for an electrochemical device that has excellent viscosity stability and is capable of forming an electrode having excellent peel strength.

Moreover, according to the present disclosure, it is possible to provide a conductive material dispersion liquid for an electrochemical device and a slurry for an electrochemical device electrode that are capable of forming an electrode having excellent peel strength.

Furthermore, according to the present disclosure, it is possible to provide an electrode for an electrochemical device that has excellent peel strength and an electrochemical device that includes this electrode for an electrochemical device.

DETAILED DESCRIPTION

The following provides a detailed description of embodiments of the present disclosure.

The presently disclosed binder composition for an electrochemical device can be used in production of a slurry for an electrochemical device electrode. Moreover, the presently disclosed binder composition for an electrochemical device can be used in production of a slurry for an electrochemical device electrode after being mixed with a carbonaceous material serving as a conductive material so as to obtain the presently disclosed conductive material dispersion liquid for an electrochemical device containing the binder composition for an electrochemical device and the carbonaceous material. Furthermore, the presently disclosed slurry for an electrochemical device electrode that is produced using the conductive material dispersion liquid for an electrochemical device can be used in formation of an electrode of an electrochemical device such as a lithium ion secondary battery. Also, a feature of the presently disclosed electrochemical device is that it includes the presently disclosed electrode for an electrochemical device that is formed using the slurry for an electrochemical device electrode.

(Binder Composition for Electrochemical Device)

The presently disclosed binder composition contains a nitrile polymer and a halogenated hydrocarbon in N-methyl-2-pyrrolidone, which is a solvent, and optionally further contains other components. The content of the aforementioned halogenated hydrocarbon in the presently disclosed binder composition is required to be not less than 2 mass ppm and not more than 400 mass ppm relative to the content of the nitrile polymer.

As a result of the content of the halogenated hydrocarbon being within the range set forth above, the presently disclosed binder composition has excellent viscosity stability and can be used to produce an electrode having excellent peel strength.

Although it is not clear why the presently disclosed binder composition has excellent viscosity stability and can cause an electrode to display excellent peel strength, the reason for this is presumed to be as follows.

The presently disclosed binder composition contains at least 2 mass ppm of the halogenated hydrocarbon relative to the content of the nitrile polymer. The halogenated hydrocarbon that is contained in at least the specific amount set forth above contributes to breaking up an oxide film present at the surface of a current collector formed of aluminum or the like during formation of an electrode mixed material layer, and, as a result, can cause the electrode mixed material layer to display strong close adherence to the current collector. On the other hand, studies conducted by the inventors revealed that an excessive amount of the halogenated hydrocarbon may result in destabilization of the binder composition due to the halogenated hydrocarbon and thickening of the binder composition. In response to this, the content of the halogenated hydrocarbon in the presently disclosed binder composition is not more than 400 mass ppm relative to the content of the nitrile polymer, and thus thickening due to excess halogenated hydrocarbon is inhibited, and viscosity stability of the binder composition can be ensured.

<Nitrile Polymer>

The nitrile polymer is a polymer that includes a nitrile group-containing monomer unit as previously described. The nitrile polymer is a component that can function as a binder that, in an electrode mixed material layer formed using the binder composition, holds an electrode active material and the like such that they do not detach from a current collector. In addition, the nitrile polymer can function as a dispersant that can cause dispersion of a conductive material such as a carbonaceous material in a conductive material dispersion liquid produced using the binder composition.

<<Chemical Composition>>

The nitrile polymer preferably includes an alkylene structural unit in addition to a nitrile group-containing monomer unit. It should be noted that the nitrile polymer may also include repeating units other than a nitrile group-containing monomer unit and an alkylene structural unit (i.e., other repeating units).

Note that the term "alkylene structural unit" as used in the present disclosure refers to a "repeating unit that is composed of only an alkylene structure represented by a general formula —$C_nH_{2n}$— (n is an integer of 2 or more)".

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio. Of these nitrile group-containing monomers, acrylonitrile is preferable.

The proportional content of nitrile group-containing monomer units in the nitrile polymer when all repeating units in the nitrile polymer are taken to be 100 mass % is preferably 10 mass % or more, more preferably 15 mass % or more, and even more preferably 20 mass % or more, and is preferably 50 mass % or less, more preferably 45 mass % or less, and even more preferably 40 mass % or less. When the proportional content of nitrile group-containing monomer units is within any of the ranges set forth above, solubility of the nitrile polymer in NMP is sufficiently ensured, and viscosity stability of the binder composition can be further improved while also increasing dispersion stability of a conductive material dispersion liquid. Moreover, peel strength of an electrode obtained using the binder composition can be even further improved.

[Alkylene Structural Unit]

Although the alkylene structural unit may be linear or branched, the alkylene structural unit is preferably linear (i.e., is preferably a linear alkylene structural unit) from a viewpoint of reducing resistance of an electrode while also improving rate characteristics of an electrochemical device. Moreover, the carbon number of the alkylene structural unit is preferably 4 or more (i.e., n in the preceding general formula is preferably an integer of 4 or more).

No specific limitations are placed on the method by which the alkylene structural unit is introduced into the nitrile polymer. For example, method (1) or (2) described below may be used.

(1) A method in which a polymer is produced from a monomer composition containing a conjugated diene monomer and then the polymer is hydrogenated in order to convert a conjugated diene monomer unit to an alkylene structural unit (2) A method in which a polymer is produced from a monomer composition containing a 1-olefin monomer Of these methods, method (1) is preferable in terms of ease of production of the nitrile polymer.

The conjugated diene monomer may be a conjugated diene compound having a carbon number of 4 or more such as 1,3-butadiene, isoprene, 2,3-dimethyl-1,3-butadiene, 2-ethyl-1,3-butadiene, or 1,3-pentadiene, for example. Of these conjugated diene monomers, conjugated diene compounds having a carbon number of 4 or more are preferable, and 1,3-butadiene is more preferable. In other words, the alkylene structural unit is preferably a structural unit obtained through hydrogenation of a conjugated diene monomer unit (i.e., is preferably a hydrogenated conjugated diene unit), more preferably a structural unit obtained through hydrogenation of a conjugated diene monomer unit having a carbon number of 4 or more (i.e., is more preferably a hydrogenated conjugated diene unit having a carbon number of 4 or more), and is even more preferably a structural unit obtained through hydrogenation of a 1,3-butadiene monomer unit (i.e., is even more preferably a hydrogenated 1,3-butadiene unit).

The 1-olefin monomer may be ethylene, propylene, 1-butene, or the like, for example.

One of these conjugated diene monomers or 1-olefin monomers may be used individually, or two or more of these conjugated diene monomers or 1-olefin monomers may be used in combination in a freely selected ratio.

The proportional content of alkylene structural units in the nitrile polymer when all repeating units in the nitrile polymer are taken to be 100 mass % is preferably 40 mass % or more, more preferably 45 mass % or more, and even more preferably 50 mass % or more, and is preferably 90 mass % or less, more preferably 85 mass % or less, and even more preferably 80 mass % or less. When the proportional content of alkylene structural units in the nitrile polymer is within any of the ranges set forth above, dispersion stability of a conductive material dispersion liquid can be improved, which is presumed to be due to increased affinity between the nitrile polymer and a carbonaceous material such as CNTs. In addition, device characteristics (for example, cycle characteristics) of an electrochemical device can be improved as a result of the nitrile polymer covering a carbonaceous material such as CNTs well.

Note that in a case in which the nitrile polymer is a polymer obtained according to method (1) described above, the total proportion constituted by alkylene structural units and conjugated diene monomer units in the nitrile polymer preferably satisfies any of the ranges set forth above.

—Other Repeating Units—

Examples of other repeating units include, but are not specifically limited to, an aromatic vinyl monomer unit, an acidic group-containing monomer unit, and a (meth)acrylic acid ester monomer unit. Note that the nitrile polymer may include one type of other repeating unit or may include two or more types of other repeating units.

Also note that in the present disclosure, "(meth)acryl" is used to indicate "acryl" and/or "methacryl".

Examples of aromatic vinyl monomers that can form an aromatic vinyl monomer unit include styrene, α-methylstyrene, p-t-butylstyrene, butoxystyrene, vinyltoluene, chlorostyrene, and vinylnaphthalene. One aromatic vinyl monomer may be used individually, or two or more aromatic vinyl monomers may be used in combination in a freely selected ratio. Of these aromatic vinyl monomers, styrene is preferable.

Examples of acidic group-containing monomers that can form an acidic group-containing monomer unit include carboxy group-containing monomers, sulfo group-containing monomers, and phosphate group-containing monomers. One acidic group-containing monomer may be used individually, or two or more acidic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

An acid anhydride that produces a carboxy group through hydrolysis can also be used as a carboxy group-containing monomer. Of these examples, acrylic acid and methacrylic acid are preferable as carboxy group-containing monomers.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One (meth)acrylic acid ester monomer may be used individually, or two or more (meth)acrylic acid ester monomers may be used in combination in a freely selected ratio.

The proportional content of other repeating units in the nitrile polymer when all repeating units in the nitrile polymer are taken to be 100 mass % is preferably not less than 0 mass % and not more than 30 mass %, more preferably not less than 0 mass % and not more than 20 mass %, even more preferably not less than 0 mass % and not more than 10 mass %, and particularly preferably not less than 0 mass % and not more than 5 mass %.

<<Properties>>

The nitrile polymer preferably has properties described below but is not specifically limited to having these properties.

[Iodine Value]

First, the iodine value of the nitrile polymer is preferably 60 mg/100 mg or less, more preferably 30 mg/100 mg or less, even more preferably 20 mg/100 mg or less, and particularly preferably 10 mg/100 mg or less. When the iodine value of the nitrile polymer is 60 mg/100 mg or less, device characteristics (cycle characteristics, rate characteristics, etc.) of an electrochemical device can be improved. Note that the lower limit for the iodine value of the nitrile polymer is not specifically limited but may be 1 mg/100 mg or more, for example.

Also note that the "iodine value" referred to in the present disclosure can be measured by a method described in the EXAMPLES section.

[Weight-Average Molecular Weight]

Next, the weight-average molecular weight of the nitrile polymer is preferably 10,000 or more, and more preferably 20,000 or more, and is preferably 250,000 or less, more preferably 200,000 or less, and even more preferably 150,000 or less. When the weight-average molecular weight of the nitrile polymer is 10,000 or more, cycle characteristics of an electrochemical device can be improved, which is presumed to be due to elution of the nitrile polymer into electrolyte solution being inhibited. On the other hand, when the weight-average molecular weight of the nitrile polymer is 250,000 or less, viscosity stability of the binder composition can be further improved while also increasing dispersion stability of a conductive material dispersion liquid.

Note that the "weight-average molecular weight" referred to in the present disclosure can be measured by a method described in the EXAMPLES section.

[Proportion of Molecular Terminals Formed of Linear Alkyl Group Having Carbon Number of 6 or More Among all Molecular Terminals]

The proportion constituted by molecular terminals formed of a linear alkyl group having a carbon number of 6 or more among all molecular terminals in the nitrile polymer (hereinafter, also referred to simply as the "linear C6 molecular terminal ratio") is preferably 30% or more, more preferably 40% or more, even more preferably 50% or more, and particularly preferably 65% or more. When the number of all molecular terminals included in a plurality of molecular chains constituting the nitrile polymer is taken to be 100% and when a linear alkyl group having a carbon number of 6 or more is present at 30% or more of these terminals, flexibility of an electrode can be improved, which is presumed to be due to movement of molecular terminals being facilitated and entanglement of molecular chains with one another increasing. In addition, resistance of an electrode can be reduced while also improving rate characteristics of an electrochemical device.

A linear alkyl group having a carbon number of 6 or more that is located at a molecular terminal may originate from a monomer, polymerization initiator, polymerization catalyst, and/or chain transfer agent used in production of the nitrile polymer, for example, but is not specifically limited thereto. Therefore, the linear C6 molecular terminal ratio can be controlled by altering the types and used amounts thereof.

For example, the linear C6 molecular terminal ratio can be increased by increasing the proportion constituted by a compound that includes a linear alkyl group having a carbon number of 6 or more (for example, 1-decanethiol) among chain transfer agent that is used in production of the nitrile polymer.

Note that although it is possible to use a compound other than a compound including a linear alkyl group having a carbon number of 6 or more as a chain transfer agent in production of the nitrile polymer (for example, tert-dodecyl mercaptan including a branched alkyl group may be used), increasing the proportion constituted by such a compound among the used chain transfer agent normally reduces the linear C6 molecular terminal ratio.

[Peak Width of Loss Tangent Tan δ in Viscoelasticity Characteristic]

The peak width of the loss tangent tan δ in a viscoelasticity characteristic for the nitrile polymer is preferably not less than 5° C. and not more than 30° C., more preferably not less than 5° C. and not more than 25° C., and even more preferably not less than 5° C. and not more than 18° C. When the peak width of the loss tangent tan δ in a viscoelasticity characteristic is within any of the ranges set forth above, cycle characteristics of an electrochemical device can be improved, which is presumed to be due to the absence of non-uniformity in a chemical composition distribution of the nitrile polymer and the ability of the nitrile polymer to uniformly swell in electrolyte solution. In addition, resistance of an electrode can be reduced.

Note that the peak width of the loss tangent tan δ in a viscoelasticity characteristic can be controlled to within a preferable range by performing split addition of monomers such as a nitrile group-containing monomer into the reaction system during production of the nitrile polymer. The peak width can also be controlled to within a preferable range by managing temperature change during production of the nitrile polymer such that it has a small amplitude of fluctuation.

<<Production Method of Nitrile Polymer>>

No specific limitations are placed on the method by which the nitrile polymer is produced. For example, the nitrile polymer may be produced by performing polymerization of a monomer composition containing one monomer or two or more monomers in an aqueous solvent and then optionally performing hydrogenation. Note that the proportional contents of monomers in the monomer composition can be set in accordance with the desired proportional contents of repeating units (monomer units and/or structural units) in the polymer.

Although the polymerization method is not specifically limited, a method such as solution polymerization, suspension polymerization, bulk polymerization, or emulsion polymerization may be used. Moreover, any of ionic polymerization, radical polymerization, living radical polymerization, various types of condensation polymerization, addition polymerization, and so forth can be adopted as the polymerization reaction. Furthermore, known emulsifiers, polymerization initiators, and chain transfer agents can be used in the polymerization as necessary. The hydrogenation can be performed by a known method.

As previously described, it is preferable to use a compound that includes a linear alkyl group having a carbon number of 6 or more as a chain transfer agent from a viewpoint of easily controlling the linear C6 molecular terminal ratio of the nitrile polymer to within a preferable range, and it is particularly preferable to use 1-decanethiol as a chain transfer agent.

The used amount of chain transfer agent is dependent on the desired linear C6 molecular terminal ratio and/or weight-average molecular weight of the nitrile polymer, but is preferably 0.1 parts by mass or more, and more preferably 0.5 parts by mass or more when all monomer used in production of the nitrile polymer is taken to be 100 parts by mass, and is preferably 2 parts by mass or less, and more preferably 1.5 parts by mass or less when all monomer used in production of the nitrile polymer is taken to be 100 parts by mass, for example.

Moreover, although monomer used in production of the nitrile polymer may be added into the reaction system as a single addition, it is preferable to perform split addition of the monomer as at least two portions from a viewpoint of easily controlling the peak width of the loss tangent tan δ in a viscoelasticity characteristic for the nitrile polymer as previously described. A polymerization method by split addition in this manner is described below with the method divided into a first stage of polymerization and second and subsequent stages of polymerization.

[First Stage of Polymerization]

In the first stage of polymerization, it is preferable that polymerization is initiated by using monomer in an amount of preferably not less than 70 mass % and not more than 95 mass %, and more preferably not less than 80 mass % and not more than 90 mass %, when all monomer used in production of the nitrile polymer is taken to be 100 mass %. Note that in a case in which a chain transfer agent is used, this chain transfer agent is preferably added to the reaction system in the first stage of polymerization.

Once the first stage of polymerization has started, supplemental addition of monomer to the reaction system and transition to a second stage of polymerization is performed at a point at which the polymerization conversion rate of charged monomer is preferably not less than 10 mass % and not more than 50 mass %, and more preferably not less than 20 mass % and not more than 40 mass %.

[Second and Subsequent Stages of Polymerization]

Although no specific limitations are placed on the number of additions when supplemental addition of monomer to the reaction system is performed, the number of additions is preferably two. In other words, it is preferable that second and third stages of polymerization are performed after the first stage of polymerization.

In the second and subsequent stages of polymerization, monomer that has not been added in the first stage of polymerization among all monomer is added into the reaction system. Note that in a case in which a third stage of polymerization is performed in addition to the second stage of polymerization, it is preferable that monomer in an amount of not less than 5 mass % and not more than 10 mass %, when all monomer used in production of the nitrile polymer is taken to be 100 mass %, is supplementally added in the second stage of polymerization.

Moreover, the monomer that is supplementally added in the second and subsequent stages of polymerization is preferably a nitrile group-containing monomer.

Furthermore, in a case in which a third stage of polymerization is performed in addition to the second stage of polymerization, supplemental addition of monomer to the reaction system and transition to the third stage of polymerization are performed at a point at which, after the second stage of polymerization has started, the polymerization conversion rate of charged monomer is preferably not less than 40 mass % and not more than 80 mass %, and more preferably not less than 50 mass % and not more than 70 mass %.

The polymerization can be ended by using a known polymerization inhibitor such as hydroquinone. Once the polymerization has ended, after treatment may be performed as necessary, and hydrogenation may optionally be performed as previously described to thereby produce the desired nitrile polymer.

[Temperature Control]

As previously described, it is important to control the temperature of the reaction system in the first stage of polymerization and the second and subsequent stages of polymerization from a viewpoint of controlling the peak width of the loss tangent tan δ in a viscoelasticity characteristic for the nitrile polymer to within a suitable range. The amplitude of temperature change (difference between the maximum temperature and the minimum temperature) in the reaction system from the start of polymerization up to the end of polymerization is preferably 6° C. or less (±3° C.), more preferably 4° C. or less (±2° C.), and even more preferably 2° C. or less (±1° C.).

The temperature in the reaction system is preferably not lower than 1° C. and not higher than 9° C., more preferably not lower than 2° C. and not higher than 8° C., and even more preferably not lower than 4° C. and not higher than 6° C.

<Halogenated Hydrocarbon>

The halogenated hydrocarbon may be any halogenated hydrocarbon in which at least one carbon atom of a hydrocarbon has been substituted with a halogen atom without any specific limitations and may be a chlorinated hydrocarbon, a fluorinated hydrocarbon, a brominated hydrocarbon, or the like. One of these halogenated hydrocarbons may be used individually, or two or more of these halogenated hydrocarbons may be used in combination in a freely selected ratio. Of these halogenated hydrocarbons, chlorinated hydrocarbons are preferable from a viewpoint of further improving viscosity stability of the binder composition and peel strength of an electrode.

Examples of chlorinated hydrocarbons include chloroalkanes and chlorobenzenes.

Specific examples of chloroalkanes include 1-chloropropane, 2-chloropropane, 1-chlorobutane, 2-chlorobutane, 2-methyl-2-chloropropane, 2-methyl-1-chloropropane, 1-chloropentane, 2-chloropentane, 3-chloropentane, 2-chloro-2-methylbutane, 1-chloro-2-ethylbutane, 1-chlorohexane, 2-chlorohexane, 3-chlorohexane, 2-chloro-methylpentane, 1-chloroheptane, 2-chloroheptane, 3-chloroheptane, 1-chlorooctane, 2-chlorooctane, 3-chlorooctane, 1-chloro-1,1,3,3-tetramethylbutane, 1-chloro-2,2,4,4-tetramethylbutane, 1-chloro-3-methylheptane, 1-chloro-2-ethylhexane, 1-chlorononane, 2-chlorononane, 3-chlorononane, 1-chloro-1,1,3-trimethylhexane, 1-chloro-1,1,3,3-tetramethylpentane, 1-chlorodecane, 2-chlorodecane, 3-chlorodecane, 1-chloro-1,1,3,3,5,5-hexamethylhexane, 1-chloro-8-methylnonane, 1-chloroundecane, 2-chloroundecane, 3-chloroundecane, 1-chlorododecane, 2-chlorododecane, 3-chlorododecane, 1-chlorotridecane, 2-chlorotridecane, 3-chlorotridecane, 1-chlorotetradecane, 2-chlorotetradecane, 3-chlorotetradecane, 1-chloropentadecane, 2-chloropentadecane, 3-chloropentadecane, 1-chlorohexadecane, 2-chlorohexadecane, 3-chlorohexadecane, 1-chloroheptadecane, 2-chloroheptadecane, 3-chloroheptadecane, 1-chlorooctadecane, 2-chlorooctadecane, and 3-chlorooctadecane.

Specific examples of chlorobenzenes include monochlorobenzene, 1,2-dichlorobenzene, 1,3-dichlorobenzene, 1,4-dichlorobenzene, 1,2,3-trichlorobenzene, 1,2,4-trichlorobenzene, 1,3,5-trichlorobenzene, 1,2,3,4-tetrachlorobenzene, 1,2,4,5-tetrachlorobenzene, pentachlorobenzene, and hexachlorobenzene.

Of these chlorinated hydrocarbons, 1-chloropropane and monochlorobenzene are preferable from a viewpoint of further improving viscosity stability of the binder composition and peel strength of an electrode. One chlorinated hydrocarbon may be used individually, or two or more chlorinated hydrocarbons may be used in combination in a freely selected ratio.

The content of the halogenated hydrocarbon in the presently disclosed binder composition is required to be not less than 2 mass ppm and not more than 400 mass ppm relative to the content of the nitrile polymer as previously described, is preferably 10 mass ppm or more, more preferably 30 mass ppm or more, even more preferably 100 mass ppm or more, and particularly preferably 200 mass ppm or more relative to the content of the nitrile polymer, and is preferably 350 mass ppm or less, and more preferably 300 mass ppm or less relative to the content of the nitrile polymer. In a situation in which the content of the halogenated hydrocarbon is less than 2 mass ppm relative to the content of the nitrile polymer, peel strength of an electrode is lost, resistance of an electrode increases, and rate characteristics of an electrochemical device deteriorate. On the other hand, in a situation in which the content of the halogenated hydrocarbon is more than 400 mass ppm relative to the content of the nitrile polymer, viscosity stability of the binder is lost, dispersion stability of a conductive material dispersion liquid decreases, and rate characteristics of an electrochemical device deteriorate.

<Other Components>

Examples of other components besides the nitrile polymer, the halogenated hydrocarbon, and NMP that can be contained in the presently disclosed binder composition include, but are not specifically limited to, binders other than the nitrile polymer (polyvinylidene fluoride, polyacrylate, etc.), reinforcing materials, leveling agents, viscosity modifiers, and additives for electrolyte solution. These other components are not specifically limited so long as they do not affect battery reactions and may be selected from commonly known components such as those described in WO2012/115096A1. The presently disclosed binder composition may also contain a solvent other than NMP.

One of these other components may be used individually, or two or more of these other components may be used in combination in a freely selected ratio.

(Conductive Material Dispersion Liquid)

The presently disclosed conductive material dispersion liquid is a composition that contains a carbon material and the binder composition set forth above. In other words, the presently disclosed conductive material dispersion liquid contains a carbonaceous material, the previously described nitrile polymer, the previously described halogenated hydrocarbon, and NMP and optionally contains other components such as previously described. As a result of the presently disclosed conductive material dispersion liquid containing the presently disclosed binder composition, it is possible to produce an electrode having excellent peel strength through a slurry for an electrode that is produced by combining the presently disclosed conductive material dispersion liquid with an electrode active material.

Note that the presently disclosed conductive material dispersion liquid is an intermediate product in production of the presently disclosed slurry for an electrode described further below and does not normally contain an electrode active material. Also note that the nitrile polymer and the halogenated hydrocarbon that are contained in the presently disclosed conductive material dispersion liquid originate from the presently disclosed binder composition, and the preferred ratio thereof is the same as in the presently disclosed binder composition.

<Carbonaceous Material>

The carbonaceous material is not specifically limited so long as it is a component that functions as a conductive material that can ensure electrical contact among an electrode active material. Examples of carbonaceous materials that may be used include carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single-layer or multi-layer graphene, and carbon non-woven fabric sheet obtained by pyrolyzing non-woven fabric made of polymer fiber. One of these carbonaceous materials may be used individually, or two or more of these carbonaceous materials may be used in combination in a freely selected ratio. Of these carbonaceous materials, carbon nanotubes are preferable.

<<Carbon Nanotubes>>

The CNTs preferably have properties described below but are not specifically limited to having these properties.

[Surface Base Content]

The surface base content of the CNTs is preferably 0.01 mmol/g or more, and more preferably 0.02 mmol/g or more, and is preferably 0.10 mmol/g or less, and more preferably 0.08 mmol/g or less. When the surface base content of the CNTs is 0.01 mmol/g or more, the amount of residual acid components attached to the surfaces of the CNTs is small, and reduction of dispersion stability of the conductive material dispersion liquid due to side reactions can be inhibited. On the other hand, when the surface base content of the CNTs is 0.10 mmol/g or less, resistance of an electrode can be reduced while also improving rate characteristics of an electrochemical device, which is presumed to be because formation of CNT aggregates can be inhibited.

Note that the "surface base content" and "surface acid content" of carbon nanotubes referred to in the present disclosure can be measured by methods described in the EXAMPLES section.

[Surface Acid Content/Surface Base Content]

A ratio of surface acid content relative to surface base content (surface acid content/surface base content) for the CNTs is preferably 0.1 or more, and more preferably 0.2 or more, and is preferably 1.0 or less, more preferably 0.8 or less, even more preferably 0.6 or less, and particularly preferably 0.5 or less. When surface acid content/surface base content is 0.1 or more, adhesiveness of an electrode mixed material layer obtained using the conductive material dispersion liquid is sufficiently ensured, and peel strength of an electrode can be further improved. On the other hand, when surface acid content/surface base content is 1.0 or less, dispersion stability of the conductive material dispersion liquid can be improved. Moreover, when surface acid content/surface base content is within any of the ranges set forth above, rate characteristics of an electrochemical device can be improved.

The BET specific surface area of the CNTs is preferably 100 $m^2/g$ or more, more preferably 150 $m^2/g$ or more, and even more preferably 200 $m^2/g$ or more, and is preferably 300 $m^2/g$ or less. Resistance of an electrode can be reduced when the BET specific surface area is 100 $m^2/g$ or more, whereas peel strength of an electrode can be sufficiently ensured when the BET specific surface area is 300 $m^2/g$ or less, which is presumed to be due to the nitrile polymer being capable of binding well to the CNTs.

Note that the "BET specific surface area" of CNTs referred to in the present disclosure can be measured by a method described in the EXAMPLES section.

[Production Method of CNTs]

No specific limitations are placed on the method by which the CNTs are produced. For example, CNTs having a surface base content and a value for surface acid content/surface base content that are within any of the preferred ranges set forth above can be produced through a step of acid treating feedstock CNTs (acid treatment step), a step of base treating the feedstock CNTs that have been acid treated (base treatment step), and a step of washing the feedstock CNTs that have been base treated (washing step).

—Acid Treatment Step—

In the acid treatment step, feedstock CNTs are subjected to acid treatment. The feedstock CNTs can be selected as appropriate from known CNTs in accordance with the desired surface-treated CNT properties (number of walls, BET specific surface area, etc.) without any specific limitations.

Although no specific limitations are placed on the method of acid treatment so long as an acid can be brought into contact with the feedstock CNTs, a method in which the feedstock CNTs are immersed in an acid treatment solution (aqueous solution of an acid) is preferable.

The acid that is contained in the acid treatment solution may be nitric acid, sulfuric acid, or hydrochloric acid, for example, without any specific limitations. One of these acids may be used individually, or two or more of these acids may be used in combination. Of these acids, nitric acid and sulfuric acid are preferable.

The time for which the feedstock CNTs are immersed in the acid treatment solution (immersion time) is preferably 1 minute or more, more preferably 10 minutes or more, even more preferably 30 minutes or more, and particularly preferably 50 minutes or more, and is preferably 120 minutes or less, more preferably 100 minutes or less, and even more preferably 80 minutes or less. The surface acid content of the surface-treated CNTs can be increased when the immersion time is 1 minute or more, whereas the surface acid content of the surface-treated CNTs does not excessively increase and production efficiency of the surface-treated CNTs is sufficiently ensured when the immersion time is 120 minutes or less.

The temperature when the feedstock CNTs are immersed in the acid treatment solution (immersion temperature) is preferably 20° C. or higher, and more preferably 40° C. or higher, and is preferably 80° C. or lower, and more preferably 70° C. or lower. When the immersion temperature is within any of the ranges set forth above, the surface acid content of the obtained surface-treated CNTs can be increased to a suitable degree.

After this immersion, CNTs that have undergone the acid treatment step (acid-treated CNTs) can be collected from a mixture of the acid-treated CNTs and the acid treatment solution by a known technique such as filtration. The acid-treated CNTs that are collected may then be washed with water as necessary.

—Base Treatment Step—

In the base treatment step, the acid-treated CNTs that have been obtained through the acid treatment step described above are subjected to base treatment.

Although no specific limitations are placed on the method of base treatment so long as a base can be brought into contact with the acid-treated CNTs, a method in which the acid-treated CNTs are immersed in a base treatment solution (aqueous solution of a base) is preferable.

The base contained in the base treatment solution may be lithium hydroxide, ammonium chloride, sodium bicarbonate, or sodium hydroxide, for example, without any specific limitations. One of these bases may be used individually, or two or more of these bases may be used in combination. Of these bases, lithium hydroxide and ammonium chloride are preferable, and lithium hydroxide is more preferable.

The time for which the acid-treated CNTs are immersed in the base treatment solution (immersion time) is preferably 10 minutes or more, more preferably 60 minutes or more, even more preferably 80 minutes or more, and particularly preferably 90 minutes or more, and is preferably 240 minutes or less, more preferably 200 minutes or less, and even more preferably 150 minutes or less. The surface base content of the surface-treated CNTs can be increased when the immersion time is 10 minutes or more, whereas the surface base content of the surface-treated CNTs does not excessively increase and production efficiency of the surface-treated CNTs is sufficiently ensured when the immersion time is 240 minutes or less.

The temperature when the acid-treated CNTs are immersed in the base treatment solution (immersion temperature) is preferably 10° C. or higher, and more preferably 20° C. or higher, and is preferably 40° C. or lower, and more preferably 27° C. or lower. When the immersion temperature is within any of the ranges set forth above, the surface base content of the obtained surface-treated CNTs can be increased to a suitable degree.

—Washing Step—

In the washing step, feedstock CNTs that have been obtained through the acid treatment step and base treatment step described above (i.e., acid/base-treated CNTs) are washed. This washing can remove excess acid components and base components (particularly base components) attached to the surfaces of the acid/base-treated CNTs and makes it possible to obtain surface-treated CNTs having specific properties.

Although no specific limitations are placed on the method by which the acid/base-treated CNTs are washed, water washing is preferable. For example, the acid/base-treated CNTs may be collected from a mixture of the acid/base-treated CNTs and the base treatment solution by a known technique such as filtration and these acid/base-treated CNTs may be washed with water. In this washing, it is possible to estimate to what extent acid components and base components have been removed by measuring the electrical conductivity of water (washing water) that has been used to wash the acid/base-treated CNTs.

After the washing step described above, removal of surface-attached water by drying and the like may be performed as necessary to obtain the surface-treated CNTs.

Note that the surface acid content and the surface base content of the surface-treated CNTs can be adjusted by altering conditions of the acid treatment step, base treatment step, and washing step described above. For example, the surface acid content and the surface base content of the surface-treated CNTs can be adjusted by altering the types and concentrations of the acid and the base that are respectively contained in the acid treatment solution and the base treatment solution used in the acid treatment step and the base treatment step. Moreover, the surface acid content of the surface-treated CNTs can be increased by increasing the immersion time in the acid treatment step, whereas the surface base content of the surface-treated CNTs can be increased by increasing the immersion time in the base treatment step. Furthermore, the surface acid content and the surface base content (particularly the surface base content) can be adjusted by altering the extent to which washing is performed in the washing step.

<Binder Composition>

The binder composition is the presently disclosed binder composition that contains the previously described nitrile polymer, the previously described halogenated hydrocarbon, and NMP and that optionally contains other components such as previously described.

No specific limitations are placed on the quantitative ratio of the carbonaceous material and the binder composition when the carbonaceous material and the binder composition are mixed to obtain the conductive material dispersion liquid. For example, the carbonaceous material and the binder composition may be mixed in a quantitative ratio such that the resultant conductive material dispersion liquid contains the nitrile polymer in an amount of preferably not less than 5 parts by mass and not more than 40 parts by mass, and more preferably not less than 10 parts by mass and not more than 30 parts by mass per 100 parts by mass of the carbonaceous material.

<Production Method of Conductive Material Dispersion Liquid>

No specific limitations are placed on the method by which the conductive material dispersion liquid is produced. The conductive material dispersion liquid can be produced by mixing the carbonaceous material and the binder composition using a known mixing device, for example.

(Slurry for Electrochemical Device Electrode)

The presently disclosed slurry for an electrode is a composition that contains an electrode active material and the conductive material dispersion liquid set forth above. In other words, the presently disclosed slurry for an electrode contains an electrode active material, the previously described carbonaceous material, the previously described nitrile polymer, the previously described halogenated hydrocarbon, and NMP and optionally contains other components such as previously described. As a result of the presently disclosed slurry for an electrode containing the presently disclosed conductive material dispersion liquid, the slurry for an electrode can be used to produce an electrode having excellent peel strength.

Note that the carbonaceous material, the nitrile polymer, and the halogenated hydrocarbon that are contained in the presently disclosed slurry for an electrode originate from the presently disclosed binder composition and conductive material dispersion liquid, and the preferred ratio thereof is the same as in the presently disclosed binder composition and conductive material dispersion liquid.

<Electrode Active Material>

Known electrode active materials can be used as the electrode active material (positive electrode active material or negative electrode active material) contained in the slurry for an electrode without any specific limitations.

A positive electrode active material that is used in a lithium ion secondary battery, for example, may be a metal oxide containing lithium (Li), but is not specifically limited thereto. Moreover, the positive electrode active material is preferably a positive electrode active material that contains one or more selected from the group consisting of cobalt (Co), nickel (Ni), manganese (Mn), and iron (Fe) in addition to lithium (Li). Examples of such positive electrode active materials include lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium manganese phosphate ($LiMnPO_4$), olivine-type lithium iron phosphate ($LiFePO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$. Note that one positive electrode active material may be used individually, or two or more positive electrode active materials may be used in combination in a freely selected ratio.

Also note that the particle diameter of the electrode active material is not specifically limited and may be the same as that of a conventionally used electrode active material.

The amount of the electrode active material in the slurry for an electrode is also not specifically limited and can be set within a range that is conventionally adopted.

<Conductive Material Dispersion Liquid>

The conductive material dispersion liquid is the presently disclosed conductive material dispersion liquid that contains the previously described carbonaceous material, the previously described nitrile polymer, the previously described halogenated hydrocarbon, and NMP and that optionally contains other components such as previously described.

<Production Method of Slurry for Electrode>

No specific limitations are placed on the method by which the slurry for an electrode is produced. The slurry for an electrode can be produced by mixing the electrode active material and the conductive material dispersion liquid using a known mixing device, for example.

(Electrode for Electrochemical Device)

The presently disclosed electrode includes an electrode mixed material layer obtained using the presently disclosed slurry for an electrode set forth above. More specifically, the presently disclosed electrode normally includes this electrode mixed material layer on a current collector. The presently disclosed electrode has excellent peel strength as a result of the electrode mixed material layer being formed from the presently disclosed slurry for an electrode set forth above.

<Current Collector>

The current collector is formed of a material having electrical conductivity and electrochemical durability. A known current collector can be used as the current collector without any specific limitations. For example, a current collector formed of aluminum or an aluminum alloy can be used as a current collector that is included in a positive electrode of a lithium ion secondary battery. Moreover, aluminum and an aluminum alloy may be used in combination, or different types of aluminum alloys may be used in combination. Aluminum and aluminum alloys make excellent current collector materials due to having heat resistance and being electrochemically stable.

<Production Method of Electrode>

No specific limitations are placed on the method by which the presently disclosed electrode is produced. For example, the presently disclosed electrode can be produced by applying the presently disclosed slurry for an electrode set forth above onto at least one side of the current collector and then drying the slurry for an electrode to form an electrode mixed material layer. In more detail, this production method includes a step of applying the slurry for an electrode onto at least one side of the current collector (application step) and a step of drying the slurry for an electrode that has been applied onto at least one side of the current collector to form an electrode mixed material layer on the current collector (drying step).

<<Application Step>>

The method by which the slurry for an electrode is applied onto the current collector is not specifically limited and may be a commonly known method. Specific examples of application methods that can be used include doctor blading, dip coating, reverse roll coating, direct roll coating, gravure coating, extrusion coating, and brush coating. In the application, the slurry for an electrode may be applied onto just one side of the current collector or may be applied onto both sides of the current collector. The thickness of the slurry coating on the current collector after application but before drying may be set as appropriate in accordance with the thickness of the electrode mixed material layer to be obtained after drying.

<<Drying Step>>

The slurry for an electrode on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry for an electrode on the current collector in this manner, an electrode mixed material layer can be formed on the current collector to thereby provide an electrode that includes the current collector and the electrode mixed material layer.

After the drying step, the electrode mixed material layer may be further subjected to a pressing process, such as mold pressing or roll pressing. This pressing process enables good close adherence of the electrode mixed material layer to the current collector.

In a case in which the electrode mixed material layer contains a curable polymer, this polymer may be cured after the electrode mixed material layer has been formed.

(Electrochemical Device)

The presently disclosed electrochemical device includes the presently disclosed electrode set forth above. Moreover, the presently disclosed electrochemical device has excellent device characteristics such as rate characteristics as a result of including the presently disclosed electrode. Note that the presently disclosed electrochemical device may be a non-aqueous secondary battery, for example, and is preferably a lithium ion secondary battery.

The following describes configuration of a lithium ion secondary battery as one example of the presently disclosed electrochemical device. This lithium ion secondary battery includes a positive electrode, a negative electrode, an electrolyte solution, and a separator. At least one of the positive electrode and the negative electrode is the presently disclosed electrode. In other words, the lithium ion secondary battery may be a lithium ion secondary battery in which the positive electrode is the presently disclosed electrode and the negative electrode is an electrode other than the presently disclosed electrode, may be a lithium ion secondary battery in which the positive electrode is an electrode other than the presently disclosed electrode and the negative electrode is the presently disclosed electrode, or may be a lithium ion secondary battery in which the positive electrode and the negative electrode are both the presently disclosed electrode.

<Electrode Other than Presently Disclosed Electrode>

Any known electrode can be used without any specific limitations as an electrode that does not correspond to the presently disclosed electrode.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution can be adjusted as appropriate and may preferably be set as 0.5 mass % to 15 mass %, more preferably as 2 mass % to 13 mass %, and even more preferably as 5 mass % to 10 mass %, for example. Moreover, a known additive such as fluoroethylene carbonate or ethyl methyl sulfone may be added to the electrolyte solution.

<Separator>

Examples of the separator include, but are not specifically limited to, separators described in JP2012-204303A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Lithium Ion Secondary Battery>

The lithium ion secondary battery according to the present disclosure can be produced by, for example, stacking the positive electrode and the negative electrode with the separator in-between, performing rolling, folding, or the like of the resultant laminate, as necessary, in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%", "ppm", and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Furthermore, in the case of a polymer that is a hydrogenated polymer obtained through hydrogenation of a polymerized product including conjugated diene monomer units, the total proportional content of non-hydrogenated conjugated diene monomer units and alkylene structural units that are hydrogenated conjugated diene monomer units in the hydrogenated polymer is the same as the ratio (charging ratio) of a conjugated diene monomer among all monomers used in polymerization of the polymerized product.

In the examples and comparative examples, the following methods were used to evaluate the weight-average molecular weight, linear C6 molecular terminal ratio, iodine value, and peak width of loss tangent tan δ in a viscoelasticity characteristic for a nitrile polymer, the surface acid content, surface base content, and BET specific surface area of CNTs, the viscosity stability of a binder composition, the dispersion stability of a conductive material dispersion liquid, the peel strength, flexibility, and resistance of an electrode, and the cycle characteristics and rate characteristics of a secondary battery.

<Weight-Average Molecular Weight>

The weight-average molecular weight (Mw) of a nitrile polymer was measured by gel permeation chromatography (GPC) under the following measurement conditions using LiBr-dimethylformamide (DMF) solution of 10 mM in concentration.

Separation column: Shodex KD-806M (produced by Showa Denko K.K.)
    Detector: Differential refractive index detector RID-10A (produced by Shimadzu Corporation)
    Flow rate of eluent: 0.3 mL/min
    Column temperature: 40° C.
    Standard polymer: TSK standard polystyrene (produced by Tosoh Corporation)

<Linear C6 Molecular Terminal Ratio>

A nitrile polymer was subjected to extraction with methanol in accordance with JIS K6229 so as to remove free mercaptan and the like and was then dried. Gas released when the dried nitrile polymer was heated at 150° C. for 20 minutes was measured by gas chromatography-mass spectrometry. A standard substance (tert-dodecyl mercaptan, 1-decanethiol) was also measured, and the proportion constituted by molecular terminals formed of a linear alkyl group having a carbon number of 6 or more among all molecular terminals in the nitrile polymer was measured by a calibration curve method using the retention times, MS spectrum, and peak areas. Note that measurement conditions in the gas chromatography-mass spectrometry were as follows.

Separation column: HP-5 ms (length 30 m, internal diameter 0.25 mm, thickness 0.25 μm)
Column oven heating temperature: Held at 40° C. for 3 minutes and then raised to 280° C. at 10° C./min
Injection temperature: 300° C.
Detector temperature: 280° C.
Measured ions: 29 to 550

<Iodine Value>

The iodine value of nitrile polymer rubber was measured in accordance with JIS K 6235.

<Peak Width of Tan δ>

A nitrile polymer was press formed at 170° C. for 5 minutes under pressing using a mold so as to obtain a test specimen of 10 mm in width, 50 mm in length, and 2.15 mm in thickness. The obtained test specimen was then measured using a viscoelasticity measurement apparatus (produced by Gabo Qualimeter Testanlagen GmbH; product name: Explexor 500N) under conditions of a measurement frequency of 10 Hz, a static strain of 0.5%, a dynamic strain of 0.2%, a measurement temperature range of −50° C. to 100° C., a heating rate of 3° C./min, a chuck separation of 30 mm, and a tension measurement mode. Next, a temperature-tan δ chart for viscoelasticity was prepared, a low temperature-side of the chart was taken to be a start point temperature, temperature at a high temperature-side of the chart was taken to be an end point temperature, and an absolute value of "end point temperature—start point temperature" was taken to be the peak width of tan δ. Note that in a case in which values of tan δ at the start point and the end point deviate, the peak width can be calculated by drawing a baseline.

<Surface Acid Content>

Approximately 1 g of measurement subject CNTs were precisely weighed, were then immersed in 100 mL of 0.01 mol dm$^{-3}$ tetrabutylhydride (TBA OH)/4-methyl-2-pentanone (MIBK) solution, and were stirred by a stirrer for 1 hour. Thereafter, centrifugal separation was performed, and the supernatant was filtered using a filter. Residual TBA OH in 50 mL of the resultant filtrate was quantitatively analyzed by performing non-aqueous coulometric titration with 0.01 mol dm$^{-3}$ perchloric acid (HClO$_4$)/MIBK solution, and then the acid content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

<Surface Base Content>

Approximately 1 g of measurement subject CNTs were precisely weighed, were then immersed in 100 mL of 0.01 mol dm$^{-3}$ HClO$_4$/MIBK solution, and were stirred by a stirrer for 1 hour. Thereafter, centrifugal separation was performed, and the supernatant was filtered using a filter. Residual HClO$_4$ in 50 mL of the resultant filtrate was quantitatively analyzed by performing non-aqueous coulometric titration with 0.01 mol dm$^{-3}$ TBA OH/MIBK solution, and then the base content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

<BET Specific Surface Area>

The BET specific surface area of CNTs was measured using a Belsorp-mini (produced by MicrotracBEL Corp.; conforming with ASTM D3037-81).

<Viscosity Stability>

A B-type viscometer (produced by Toki Sangyo Co., Ltd.; product name: TVB-10; rotation speed: 60 rpm) was used to measure the viscosity η0 of an obtained binder composition. Next, the binder composition that had undergone viscosity measurement was stirred for 24 hours using a planetary mixer (rotation speed: 60 rpm), and then the viscosity η1 of the binder composition after stirring was measured using the same B-type viscometer (rotation speed: 60 rpm) as described above. The viscosity maintenance rate Δη of the binder composition between before and after stirring was calculated (Δη=η1/η0×100(%)), and viscosity stability of the binder composition was evaluated by the following standard. Note that the temperature during viscosity measurement was 25° C. A value of closer to 100% for the viscosity maintenance rate Δη indicates that the binder composition has better viscosity stability.

A: Viscosity maintenance rate Δη of not less than 90% and not more than 110%
B: Viscosity maintenance rate Δη of not less than 80% and less than 90%
C: Viscosity maintenance rate Δη of less than 80% or more than 110%

<Dispersion Stability>

A B-type viscometer (produced by Toki Sangyo Co., Ltd.; product name: TVB-10; rotation speed: 60 rpm) was used to measure the viscosity η2 of an obtained conductive material dispersion liquid. Next, the conductive material dispersion liquid that had undergone viscosity measurement was stirred for 24 hours using a planetary mixer (rotation speed: 60 rpm), and then the viscosity η3 of the conductive material dispersion liquid after stirring was measured using the same B-type viscometer (rotation speed: 60 rpm) as described above. The viscosity maintenance rate Δη' of the conductive material dispersion liquid between before and after stirring was calculated (Δη'=η3/η2×100(%)), and dispersion stability of the conductive material dispersion liquid was evaluated by the following standard. Note that the temperature during viscosity measurement was 25° C. A value of closer to 100% for the viscosity maintenance rate Δη' indicates that the conductive material dispersion liquid has better dispersion stability.

A: Viscosity maintenance rate Δη' of not less than 90% and not more than 110%
B: Viscosity maintenance rate Δη' of not less than 80% and less than 90%
C: Viscosity maintenance rate Δη' of not less than 70% and less than 80%
D: Viscosity maintenance rate Δη' of less than 70% or more than 110%

<Peel Strength>

A positive electrode for a lithium ion secondary battery was cut out as a rectangle of 100 mm in length and 10 mm in width to obtain a test specimen. The test specimen was placed with a surface at which the positive electrode mixed material layer was present facing downward, cellophane tape (tape in accordance with JIS Z1522) was affixed to the surface of the positive electrode mixed material layer, and then the stress when one end of the current collector was pulled in a perpendicular direction at a pulling speed of 100 mm/min to peel off the current collector was measured. (Note that the cellophane tape was fixed to a test stage.) Three measurements were performed in this manner. An average value of the measurements was determined, was taken to be the peel strength, and was evaluated by the following standard. A larger value for the peel strength indicates stronger close adherence of the positive electrode mixed material layer to the current collector formed of aluminum foil.

A: Peel strength of 30 N/m or more
B: Peel strength of not less than 20 N/m and less than 30 N/m
C: Peel strength of less than 20 N/m <Flexibility>

A cylindrical rod made of SUS was placed on the positive electrode mixed material layer-side of a positive electrode for a lithium ion secondary battery, and the positive electrode was wound around the cylindrical rod. This was performed using SUS cylindrical rods of different diameters. The occurrence of cracking of the positive electrode mixed material layer was visually evaluated. A smaller diameter indicates that the positive electrode mixed material layer and the positive electrode have better flexibility.

A: Cracking does not occur with rod of 2.0 mm in diameter
B: Cracking does not occur with rod of 2.5 mm in diameter
C: Cracking does not occur with rod of 3.0 mm in diameter
D: Cracking does not occur with rod of 3.5 mm in diameter <Resistance (Penetration Resistance)>

A positive electrode for a lithium ion secondary battery was punched out as a circular shape of 12 mm in diameter, and then the thickness d (μm) of the punched out test specimen and the area S of the positive electrode mixed material layer were measured. The test specimen was sandwiched in a jig of a tensile compression tester (produced by Imada Seisakusho Co., Ltd.; product name: SV-301NA) and was pressed with a pressure of 20 MPa. A two-terminal type clip was connected to the jig and a measurement cable was connected to an automatic polarization system (produced by Hokuto Denko Corporation; product name: HSV-110). A fixed current I (=10 mA) was passed through the jig for 10 minutes in chronopotentiometry mode, and the voltage V (V) at that time was measured. The resistance R ($\Omega$) was calculated by Ohm's law (R=V/I) and then the volume resistivity $\rho$ ($\Omega \cdot cm$) was calculated ($\rho=R \times S/d$) so as to determine the volume resistivity p according to a penetration method. The volume resistivity $\rho$ determined in this manner was evaluated in accordance with the following evaluation standard.

A: Volume resistivity $\rho$ of less than 15 $\Omega \cdot cm$
B: Volume resistivity $\rho$ of not less than 15 $\Omega \cdot cm$ and less than 30 $\Omega \cdot cm$
C: Volume resistivity $\rho$ of not less than 30 $\Omega \cdot cm$ and less than 45 $\Omega \cdot cm$
D: Volume resistivity $\rho$ of 45 $\Omega \cdot cm$ or more <Cycle Characteristics>

A lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was then discharged to a cell voltage of 3.00 V by a 0.2 C constant-current method at a temperature of 25° C. Thereafter, the lithium ion secondary battery was CC-CV charged by a 0.2 C constant-current method (upper limit cell voltage 4.20 V) and was then CC discharged to 3.00 V by a 0.2 C constant-current method. This charging and discharging at 0.2 C was repeated three times.

Next, the lithium ion secondary battery was subjected to 100 cycles of a charge/discharge operation with a cell voltage of 4.20 V to 3.00 V and a charge/discharge rate of 1.0 C in an environment having a temperature of 25° C. The discharge capacity of the $1^{st}$ cycle was defined as X1, and the discharge capacity of the $100^{th}$ cycle was defined as X2. The discharge capacity X1 and the discharge capacity X2 were used to calculate a capacity maintenance rate expressed by $\Delta C=(X2/X1) \times 100(\%)$, which was then evaluated by the following standard. A larger value for the capacity maintenance rate $\Delta C$ indicates that the lithium ion secondary battery has better cycle characteristics.

A: Capacity maintenance rate $\Delta C$ of 93% or more
B: Capacity maintenance rate $\Delta C$ of not less than 90% and less than 93%
C: Capacity maintenance rate $\Delta C$ of not less than 87% and less than 90%
D: Capacity maintenance rate $\Delta C$ of less than 87%

<Rate Characteristics>

A lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was then discharged to a cell voltage of 3.00 V by a 0.2 C constant-current method at a temperature of 25° C. Thereafter, the lithium ion secondary battery was CC-CV charged by a 0.2 C constant-current method (upper limit cell voltage 4.20 V) and was then CC discharged to 3.00 V by a 0.2 C constant-current method. This charging and discharging at 0.2 C was repeated three times.

Next, the lithium ion secondary battery was charged to 4.2 V by a 0.1 C constant-current method and was then discharged to 3.0 V at 0.1 C in an environment having a temperature of 25° C. in order to determine the 0.1 C discharge capacity. Thereafter, the lithium ion secondary battery was charged to 4.2 V at 0.1 C and was then discharged to 3.0 V at 1 C in order to determine the 1 C discharge capacity. These measurements were performed for 10 lithium ion secondary battery cells, and average values of the measured values were taken to be the 0.1 C discharge capacity (a) and the 1 C discharge capacity (b). An electric capacity ratio of the 1 C discharge capacity (b) and the 0.1 C discharge capacity (a) was calculated (=b/a×100(%)) and was evaluated by the following standard. A larger value for this electric capacity ratio indicates that the lithium ion secondary battery has better rate characteristics.

A: Electric capacity ratio of 85% or more
B: Electric capacity ratio of not less than 75% and less than 85%
C: Electric capacity ratio of not less than 60% and less than 75%
D: Electric capacity ratio of less than 60%

Example 1

<Production of Nitrile Polymer>

A reactor was charged with 200 parts of deionized water and 2.25 parts of fatty acid potassium soap (potassium salt of fatty acid) to produce a soap aqueous solution. Next, 21 parts of acrylonitrile and 0.8 parts of 1-decanethiol (chain transfer agent) were added into the soap aqueous solution in this order, gas inside of the reactor was purged three times with nitrogen, and then 64 parts of 1,3-butadiene was added. The inside of the reactor was then held at 5±1 C while adding 0.1 parts of cumene hydroperoxide (polymerization initiator) so as to initiate a first stage of polymerization under stirring. At the point at which the polymerization conversion rate relative to charged monomer reached 30%, 8 parts of acrylonitrile was supplementally added into the reactor, and a second stage of polymerization was performed. Thereafter, at the point at which the polymerization conversion rate relative to charged monomer reached 60%, 7 parts of acrylonitrile was supplementally added into the reactor, and a third stage of polymerization was performed. Thereafter, at the point at which the polymerization conversion rate relative to charged monomer reached 90%, 0.1 parts of hydroquinone (polymerization inhibitor) aqueous solution of 10% in concentration was added so as to stop the polymerization reaction. Once the polymerization reaction had stopped, residual monomer was removed using a rotary evaporator with a water temperature of 60° C. to yield a latex of polymer rubber (solid content concentration: approximately 25 weight %).

Next, the latex of polymer rubber obtained as described above was added to an aqueous solution of aluminum sulfate in an amount of 3% relative to rubber content of the latex, stirring was performed to cause coagulation of the latex, separation by filtration was performed while carrying out washing with water, and then 12 hours of vacuum drying was performed at 60° C. to yield the polymer rubber. The obtained polymer rubber was dissolved in acetone such as to have a concentration of 12%, the resultant solution was loaded into an autoclave, 500 ppm of a palladium-silica catalyst was added relative to the nitrile group-containing copolymer rubber, and a hydrogenation reaction was performed at a hydrogen pressure of 3 MPa and a temperature of 50° C. Once the hydrogenation reaction had ended, the product was poured into a large amount of water to cause coagulation, and then filtration and drying were performed to yield a nitrile polymer. Weight-average molecular weight, linear C6 molecular terminal ratio, iodine value, and peak width of tan δ were measured for the obtained nitrile polymer. The results are shown in Table 1.

<Production of Binder Composition for Positive Electrode>

A binder composition for a positive electrode was produced through heated mixing of 8 parts of the nitrile polymer obtained as described above, 0.0016 parts (200 ppm relative to amount of nitrile polymer) of 1-chloropropane, and 92 parts of NMP. The binder stability of the obtained binder composition for a positive electrode was measured. The result is shown in Table 1.

<Production of Surface-Treated CNTs>

Multi-walled carbon nanotubes (specific surface area: 250 m$^2$/g) that had been weighed out in an amount of 1 g were added to a mixed solution of 40 mL of concentrated nitric acid and 40 mL of 2 M sulfuric acid and were stirred for 1 hour while being kept at 60° C. (acid treatment). Thereafter, solid-liquid separation was performed by filtration using filter paper (Toyo Roshi Kaisha, Filter Paper No. 2, 125 mm). Solids on the filter paper were washed using 200 mL of purified water, and then CNT solids (acid-treated CNTs) were collected. These CNT solids were added into 200 mL of lithium hydroxide aqueous solution having a concentration of 2.5 mol/L and were subsequently stirred for 2 hours while being kept at 25° C. in a water bath (base treatment). Thereafter, solid-liquid separation was performed by vacuum filtration using a membrane filter having a pore diameter of 10 μm. CNT solids (acid/base-treated CNTs) on the membrane filter were repeatedly washed using purified water. Once the electrical conductivity of washing water reached 50 μs/m or less, solid-liquid separation of the CNT solids was performed by the same method as described above. The obtained CNT solids were dried under reduced pressure at 50° C. for 8 hours to thereby produce surface-treated CNTs. Surface acid content, surface base content, and BET specific surface area were measured for these surface-treated CNTs. In addition, the ratio of the surface acid content relative to the surface base content was calculated. The results are shown in Table 1.

<Production of Conductive Material Dispersion Liquid>

After stirring (3,000 rpm, 10 minutes) 5 parts of the surface-treated CNTs as a carbonaceous material, 1 part (amount in terms of solid content of nitrile rubber) of the binder composition, and 94 parts of NMP using a disper blade, these materials were dispersed at a circumferential speed of 8 m/s for 1 hour using a bead mill in which zirconia beads of 1 mm in diameter were used to thereby produce a conductive material dispersion liquid having a solid content concentration of 6.0%. Dispersion stability was evaluated for this conductive material dispersion liquid. The result is shown in Table 1.

<Production of Slurry for Positive Electrode>

A slurry for a positive electrode was produced by adding 100 parts of a ternary active material having a layered structure (LiNi$_{0.6}$Co$_{0.2}$Mn$_{0.2}$O$_2$; volume-average particle diameter: 10 μm) as a positive electrode active material and an appropriate amount of NMP as a dispersion medium to the conductive material dispersion liquid obtained as described above and stirring (3,000 rpm, 20 minutes) these materials using a disper blade. Note that the additive amount of NMP was adjusted such that the viscosity of the obtained slurry for a positive electrode at 60 rpm was within a range of 3,000 mPa·s to 4,000 mPa·s.

<Production of Positive Electrode>

Aluminum foil of 20 μm in thickness was prepared as a current collector. The slurry for a positive electrode obtained as described above was applied onto one side of the aluminum foil by a comma coater such as to have a coating weight after drying of 20 mg/cm$^2$, was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including a positive electrode mixed material layer (density: 3.2 g/cm$^3$) and aluminum foil. This sheet-shaped positive electrode was cut to 48.0 mm in width and 47 cm in length to obtain a positive electrode for a lithium ion secondary battery. Peel strength, flexibility, and resistance were evaluated for this positive electrode. The results are shown in Table 1.

<Production of Negative Electrode>

A slurry for a negative electrode was produced by using a planetary mixer to stir a mixture of 90 parts of spherical artificial graphite (volume-average particle diameter: 12 μm) and 10 parts of SiO$_x$ (volume-average particle diameter: 10 μm) as negative electrode active materials, 1 part of a styrene butadiene polymer as a binder for a negative electrode, 1 part of carboxymethyl cellulose as a thickener, and an appropriate amount of water as a dispersion medium.

Next, copper foil of 15 μm in thickness was prepared as a current collector. The slurry for a negative electrode obtained as described above was applied onto one side of the copper foil such as to have a coating weight after drying of 10 mg/cm$^2$, and was dried at 60° C. for 20 minutes and at 120° C. for 20 minutes. Thereafter, 2 hours of heat treatment was performed at 150° C. to obtain a negative electrode web. This negative electrode web was rolled by roll pressing to produce a sheet-shaped negative electrode including a negative electrode mixed material layer of 1.6 g/cm$^3$ in density and copper foil. The sheet-shaped negative electrode was cut to 50.0 mm in width and 52 cm in length to obtain a negative electrode for a lithium ion secondary battery.
<Production of Lithium Ion Secondary Battery>

The positive electrode and negative electrode produced as described above were wound up with the electrode mixed material layers thereof facing each other and with a separator (microporous membrane made of polypropylene) of 15 μm in thickness in-between using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis and the minor axis (major axis/minor axis) was 7.7.

In addition, an electrolyte solution (LiPF$_6$ solution of 1.0 M in concentration (solvent: mixed solution having 5 mass % of fluoroethylene carbonate added to mixed solvent of ethylene carbonate/ethyl methyl carbonate=3/7 (mass ratio); additive: 2 volume % of vinylene carbonate)) was prepared.

The compressed roll was subsequently enclosed in a laminate case made of aluminum together with 3.2 g of the electrolyte solution. A nickel lead was connected to a specific position on the negative electrode for a lithium ion secondary battery, an aluminum lead was connected to a specific position on the positive electrode for a lithium ion secondary battery, and then an opening of the case was heat sealed to obtain a lithium ion secondary battery. This lithium ion secondary battery had a pouch shape of 35 mm in width, 60 mm in height, and 5 mm in thickness. The nominal capacity of the battery was 700 mAh.

Cycle characteristics and rate characteristics were evaluated for the obtained lithium ion secondary battery. The results are shown in Table 1.

Example 2

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amount of 1-chloropropane used in production of the binder composition for a positive electrode was changed to 0.0028 parts (350 ppm relative to amount of nitrile polymer). The results are shown in Table 1.

Example 3

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amount of 1-chloropropane used in production of the binder composition for a positive electrode was changed to 0.0008 parts (100 ppm relative to amount of nitrile polymer). The results are shown in Table 1.

Example 4

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amount of 1-chloropropane used in production of the binder composition for a positive electrode was changed to 0.00008 parts (10 ppm relative to amount of nitrile polymer). The results are shown in Table 1.

Example 5

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that monochlorobenzene was used instead of 1-chloropropane in production of the binder composition for a positive electrode. The results are shown in Table 1.

Example 6

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that 0.48 parts of 1-decanethiol and 0.32 parts of tert-dodecyl mercaptan (TDM) were used instead of 0.8 parts of 1-decanethiol as a chain transfer agent in production of the nitrile polymer. The results are shown in Table 1.

Example 7

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that 0.32 parts of 1-decanethiol and 0.48 parts of TDM were used instead of 0.8 parts of 1-decanethiol as a chain transfer agent in production of the nitrile polymer. The results are shown in Table 1.

Example 8

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that 0.8 parts of TDM was used instead of 0.8 parts of 1-decanethiol as a chain transfer agent in production of the nitrile polymer. The results are shown in Table 1.

Example 9

A binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that a nitrile polymer produced as described below was used. The results are shown in Table 2.
<Production of Nitrile Polymer>
A reactor was charged with 200 parts of deionized water and 2.25 parts of fatty acid potassium soap (potassium salt of fatty acid) to produce a soap aqueous solution. Next, 21 parts of acrylonitrile and 0.8 parts of 1-decanethiol (chain transfer agent) were added into the soap aqueous solution in this order, gas inside of the reactor was purged three times with nitrogen, and then 64 parts of 1,3-butadiene was added. The inside of the reactor was then held at 5±1 C while adding 0.1 parts of cumene hydroperoxide (polymerization initiator) so as to initiate a first stage of polymerization under stirring. At the point at which the polymerization conversion rate relative to charged monomer reached 50%, 15 parts of acrylonitrile was supplementally added into the reactor, and a second stage of polymerization was performed. Thereafter, at the point at which the polymerization conversion rate relative to charged monomer reached 90%, 0.1 parts of hydroquinone (polymerization inhibitor) aqueous solution of 10% in concentration was added so as to stop the polymerization reaction. Once the polymerization reaction had stopped, residual monomer was removed using a rotary evaporator with a water temperature of 60° C. to yield a latex of polymer rubber (solid content concentration: approximately 25 weight %).
A nitrile polymer was then obtained by the same procedure as in Example 1 with the exception that the obtained latex of polymer rubber was used.

Example 10

A binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that a nitrile polymer produced as described below was used. The results are shown in Table 2.
<Production of Nitrile Polymer>
A reactor was charged with 200 parts of deionized water and 2.25 parts of fatty acid potassium soap (potassium salt of fatty acid) to produce a soap aqueous solution. Next, 36 parts of acrylonitrile and 0.8 parts of 1-decanethiol (chain transfer agent) were added into the soap aqueous solution in this order, gas inside of the reactor was purged three times with nitrogen, and then 64 parts of 1,3-butadiene was added. The inside of the reactor was then held at 5±1 C while adding 0.1 parts of cumene hydroperoxide (polymerization initiator) so as to initiate polymerization under stirring. Thereafter, at the point at which the polymerization conversion rate relative to charged monomer reached 90%, 0.1 parts of hydroquinone (polymerization inhibitor) aqueous solution of 10% in concentration was added so as to stop the polymerization reaction. Once the polymerization reaction had stopped, residual monomer was removed using a rotary evaporator with a water temperature of 60° C. to yield a latex of polymer rubber (solid content concentration: approximately 25 weight %).
A nitrile polymer was then obtained by the same procedure as in Example 1 with the exception that the obtained latex of polymer rubber was used.

Example 11

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that in production of the nitrile polymer, the temperature in the first stage of polymerization was changed to 3±1 C, the temperature in the second stage of polymerization was changed to 5±1° C., and the temperature in the third stage of polymerization was changed to 7±1° C. The results are shown in Table 2.

Example 12

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that in production of the nitrile polymer, the temperature in the first stage of polymerization was changed to 2±1 C, the temperature in the second stage of polymerization was changed to 5±1° C., and the temperature in the third stage of polymerization was changed to 8±1° C. The results are shown in Table 2.

Example 13

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the base treatment time in production of the surface-treated CNTs was changed from 2 hours to 4 hours. The results are shown in Table 2.

Example 14

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that ammonium chloride aqueous solution of 2.5 mol/L in concentration was used to perform base treatment instead of lithium hydroxide aqueous solution of 2.5 mol/L in concentration in production of the surface-treated CNTs. The results are shown in Table 2.

Example 15

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that in production of the surface-treated CNTs, other multi-walled CNTs (specific surface area: 110 m²/g) were used as feedstock CNTs, base treatment was not performed, and the acid-treated CNTs were washed until the electrical conductivity of washing water was 50 μs/m or less. The results are shown in Table 2.

Comparative Example 1

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amount of 1-chloropropane used in production of the binder composition for a positive electrode was changed to 0.004 parts (500 ppm relative to amount of nitrile polymer). The results are shown in Table 2.

Comparative Example 2

A nitrile polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that 1-chloropropane was not used in production of the binder composition for a positive electrode. The results are shown in Table 2.

TABLE 1

| | | | | Example 1 | Example 2 | Example 3 | Example 4 |
|---|---|---|---|---|---|---|---|
| Conductive material dispersion liquid | Binder composition | Nitrile polymer | Type | HNBR | HNBR | HNBR | HNBR |
| | | | Linear C6 molecular terminal ratio [%] | 100 | 100 | 100 | 100 |
| | | | Iodine value [mg/100 mg] | 5 | 5 | 5 | 5 |
| | | | Mw [—] | 120,000 | 120,000 | 120,000 | 120,000 |
| | | | Peak width of tan δ [° C.] | 14 | 14 | 14 | 14 |
| | | Halogenated hydrocarbon | Type | 1-Chloropropane | 1-Chloropropane | 1-Chloropropane | 1-Chloropropane |
| | | | Content [mass ppm] | 200 | 350 | 100 | 10 |
| | Carbonaceous material | | Type | CNT | CNT | CNT | CNT |
| | | | Surface base content [mmol/g] | 0.05 | 0.05 | 0.05 | 0.05 |
| | | | Surface acid content/ Surface base content [—] | 0.3 | 0.3 | 0.3 | 0.3 |
| | | | BET specific surface area [m²/g] | 250 | 250 | 250 | 250 |
| | | | Viscosity stability | A | B | A | A |
| | | | Dispersion stability | A | B | A | A |
| | | | Peel strength | A | A | B | B |
| | | | Flexibility | A | A | A | A |
| | | | Resistance | A | B | A | B |
| | | | Rate characteristics | A | A | A | B |
| | | | Cycle characteristics | A | A | A | A |
| | | | | Example 5 | Example 6 | Example 7 | Example 8 |
| Conductive material dispersion liquid | Binder composition | Nitrile polymer | Type | HNBR | HNBR | HNBR | HNBR |
| | | | Linear C6 molecular terminal ratio [%] | 100 | 58 | 41 | 0 |
| | | | Iodine value [mg/100 mg] | 5 | 5 | 5 | 5 |
| | | | Mw [—] | 120,000 | 120,000 | 130,000 | 130,000 |
| | | | Peak width of tan δ [° C.] | 14 | 12 | 14 | 14 |
| | | Halogenated hydrocarbon | Type | Monochlorobenzene | 1-Chloropropane | 1-Chloropropane | 1-Chloropropane |
| | | | Content [mass ppm] | 200 | 200 | 200 | 200 |
| | Carbonaceous material | | Type | CNT | CNT | CNT | CNT |
| | | | Surface base content [mmol/g] | 0.05 | 0.05 | 0.05 | 0.05 |
| | | | Surface acid content/ Surface base content [—] | 0.3 | 0.3 | 0.3 | 0.3 |
| | | | BET specific surface area [m²/g] | 250 | 250 | 250 | 250 |
| | | | Viscosity stability | A | A | A | A |
| | | | Dispersion stability | A | A | A | A |
| | | | Peel strength | A | A | A | A |
| | | | Flexibility | A | B | C | D |
| | | | Resistance | A | B | B | C |
| | | | Rate characteristics | A | B | B | B |
| | | | Cycle characteristics | A | A | A | A |

TABLE 2

|  |  |  |  | Example 9 | Example 10 | Example 11 | Example 12 | Example 13 |
|---|---|---|---|---|---|---|---|---|
| Conductive material dispersion liquid | Binder composition | Nitrile polymer | Type | HNBR | HNBR | HNBR | HNBR | HNBR |
|  |  |  | Linear C6 molecular terminal ratio [%] | 100 | 100 | 100 | 100 | 100 |
|  |  |  | Iodine value [mg/100 mg] | 5 | 5 | 5 | 5 | 5 |
|  |  |  | Mw [—] | 120,000 | 120,000 | 120,000 | 120,000 | 120,000 |
|  |  |  | Peak width of tan δ [° C.] | 20 | 35 | 25 | 40 | 14 |
|  |  | Halogenated hydrocarbon | Type | 1-Chloropropane | 1-Chloropropane | 1-Chloropropane | 1-Chloropropane | 1-Chloropropane |
|  |  |  | Content [mass ppm] | 200 | 200 | 200 | 200 | 200 |
|  | Carbonaceous material |  | Type | CNT | CNT | CNT | CNT | CNT |
|  |  |  | Surface base content [mmol/g] | 0.05 | 0.05 | 0.05 | 0.05 | 0.75 |
|  |  |  | Surface acid content/ Surface base content [—] | 0.3 | 0.3 | 0.3 | 0.3 | 0.2 |
|  |  |  | BET specific surface area [m²/g] | 250 | 250 | 250 | 250 | 250 |
|  | Viscosity stability |  |  | A | A | A | A | A |
|  | Dispersion stability |  |  | A | A | A | A | A |
|  | Peel strength |  |  | A | A | A | A | A |
|  | Flexibility |  |  | A | A | A | A | A |
|  | Resistance |  |  | A | A | B | D | B |
|  | Rate characteristics |  |  | A | A | B | C | B |
|  | Cycle characteristics |  |  | B | D | C | D | A |

|  |  |  |  | Example 14 | Example 15 | Comparative Example 1 | Comparative Example 2 |
|---|---|---|---|---|---|---|---|
| Conductive material dispersion liquid | Binder composition | Nitrile polymer | Type | HNBR | HNBR | HNBR | HNBR |
|  |  |  | Linear C6 molecular terminal ratio [%] | 100 | 100 | 100 | 100 |
|  |  |  | Iodine value [mg/100 mg] | 5 | 5 | 5 | 5 |
|  |  |  | Mw [—] | 120,000 | 120,000 | 120,000 | 120,000 |
|  |  |  | Peak width of tan δ [° C.] | 14 | 14 | 14 | 14 |
|  |  | Halogenated hydrocarbon | Type | 1-Chloropropane | 1-Chloropropane | 1-Chloropropane | — |
|  |  |  | Content [mass ppm] | 200 | 200 | 500 | — |
|  | Carbonaceous material |  | Type | CNT | CNT | CNT | CNT |
|  |  |  | Surface base content [mmol/g] | 0.05 | 0.008 | 0.05 | 0.05 |
|  |  |  | Surface acid content/ Surface base content [—] | 0.6 | 2.4 | 0.3 | 0.3 |
|  |  |  | BET specific surface area [m²/g] | 250 | 110 | 250 | 250 |
|  | Viscosity stability |  |  | A | A | C | A |
|  | Dispersion stability |  |  | C | D | C | A |
|  | Peel strength |  |  | A | B | A | C |
|  | Flexibility |  |  | A | A | A | A |
|  | Resistance |  |  | C | C | D | D |
|  | Rate characteristics |  |  | C | C | D | D |
|  | Cycle characteristics |  |  | A | B | A | A |

It can be seen from Tables 1 and 2 that the binder compositions of Examples 1 to 15, which each contain a nitrile polymer, NMP, and a halogenated hydrocarbon and in each of which the content of the halogenated hydrocarbon is not less than 2 mass ppm and not more than 400 mass ppm relative to the content of the nitrile polymer, have excellent viscosity stability, and that an electrode having excellent peel strength can be produced using these binder compositions.

INDUSTRIAL APPLICABILITY

According to the present disclosure, it is possible to provide a binder composition for an electrochemical device that has excellent viscosity stability and is capable of forming an electrode having excellent peel strength.

Moreover, according to the present disclosure, it is possible to provide a conductive material dispersion liquid for an electrochemical device and a slurry for an electrochemical device electrode that are capable of forming an electrode having excellent peel strength.

Furthermore, according to the present disclosure, it is possible to provide an electrode for an electrochemical device that has excellent peel strength and an electrochemical device that includes this electrode for an electrochemical device.

The invention claimed is:

1. A binder composition for an electrochemical device comprising: a polymer including a nitrile group-containing monomer unit; N-methyl-2-pyrrolidone; and a halogenated hydrocarbon, wherein
content of the halogenated hydrocarbon is not less than 2 mass ppm and not more than 400 mass ppm relative to content of the polymer.

2. The binder composition for an electrochemical device according to claim 1, wherein peak width of loss tangent tan δ in a viscoelasticity characteristic for the polymer is not less than 5° C. and not more than 30° C.

3. The binder composition for an electrochemical device according to claim 1, wherein a proportion constituted by molecular terminals formed of a linear alkyl group having a carbon number of 6 or more among all molecular terminals in the polymer is 30% or more.

4. A conductive material dispersion liquid for an electrochemical device comprising: the binder composition for an electrochemical device according to claim 1; and a carbonaceous material.

5. The conductive material dispersion liquid for an electrochemical device according to claim 4, wherein
the carbonaceous material includes one or more carbon nanotubes, and
the carbon nanotubes have a surface base content of not less than 0.01 mmol/g and not more than 0.10 mmol/g and a ratio of surface acid content relative to the surface base content of not less than 0.1 and not more than 1.0.

6. A slurry for an electrochemical device electrode comprising: the conductive material dispersion liquid for an electrochemical device according to claim 4; and an electrode active material.

7. An electrode for an electrochemical device comprising an electrode mixed material layer formed using the slurry for an electrochemical device electrode according to claim 6.

8. An electrochemical device comprising the electrode for an electrochemical device according to claim 7.

\* \* \* \* \*